United States Patent
Rao et al.

[11] Patent Number: 5,414,037
[45] Date of Patent: May 9, 1995

[54] COMPOSITION FOR MOLDING OF VEHICLE BODY PANELS

[75] Inventors: Nippani R. Rao, Farmington Hills; Saad M. Abouzahr, Highland; Russ Spencer, W. Bloomfield; Denis E. Falkowski, Farmington Hills, all of Mich.

[73] Assignee: Chrysler Corporation, Highland Park, Mich.

[21] Appl. No.: 140,943

[22] Filed: Oct. 25, 1993

Related U.S. Application Data

[62] Division of Ser. No. 28,077, Mar. 8, 1993, Pat. No. 5,336,710.

[51] Int. Cl.⁶ .................. C08K 3/34; B29C 45/46; B27N 3/10; B32B 7/00
[52] U.S. Cl. .................. 524/445; 264/257; 264/258; 264/300; 264/328.1; 264/328.18; 428/260
[58] Field of Search ........... 264/257, 258, 300, 328.1, 264/328.18; 428/228, 232, 268, 260; 524/425, 444, 449, 451, 494, 445

[56] References Cited

U.S. PATENT DOCUMENTS

| | | | |
|---|---|---|---|
| 3,022,210 | 2/1962 | Phillips | 156/180 |
| 3,684,645 | 8/1972 | Temple et al. | 428/220 |
| 3,761,560 | 9/1973 | Newlove | 264/257 |
| 3,903,343 | 9/1975 | Pfaff | 428/168 |
| 4,052,358 | 10/1977 | Wada et al. | 523/527 |
| 4,201,823 | 5/1980 | Russell | 428/246 |
| 4,480,079 | 10/1984 | Orton et al. | 526/301 |
| 4,517,323 | 5/1985 | Ferguson et al. | 523/527 |
| 4,610,835 | 9/1986 | Ghavamikia | 264/250 |
| 4,619,954 | 10/1986 | Warner, II | 523/516 |
| 4,810,744 | 3/1989 | Light | 524/494 |
| 4,873,133 | 10/1989 | Giles, Jr. | 428/107 |
| 4,891,176 | 1/1990 | Drysdale et al. | 264/250 |
| 4,950,532 | 8/1990 | Das et al. | 428/290 |
| 4,986,948 | 1/1991 | Komiya et al. | 264/257 |
| 5,013,771 | 5/1991 | Guillet et al. | 523/202 |

OTHER PUBLICATIONS

"Molecular Weight", Principles of Polymerization, by Odian, pp. 20-22, 2nd Edition, John Wiley & Sons, N.Y. 1981.

*Primary Examiner*—Tae H. Yoon

[57] ABSTRACT

A resin transfer molding process for manufacture of class 'A' surface vehicle body panels. The process has critical ranges of resin (38%–44%) reinforcement fibers (28%–32%) and a filler material (28%–30%).

14 Claims, No Drawings

COMPOSITION FOR MOLDING OF VEHICLE BODY PANELS

CROSS-REFERENCES TO RELATED APPLICATIONS

This application is a division of application Ser. No. 08/028,077 filed Mar. 8, 1993, now U.S. Pat. No. 5,336,710, by the same inventors as in the present application.

BACKGROUND

The present invention relates to a composition and process for resin transfer molding of composite body panels which require a class 'A' type surface. More specifically, the present invention relates to a modified acrylic resin glass fiber and filler composition which provides good results in molding of vehicle body panels having class 'A' type surfaces.

In recent years, it has been more desirable to use composite type body panels for manufacture of external vehicle body surfaces. This is particularly the case in low volume "niche" vehicles. Many methods are shown in the prior art for utilizing of various glass reinforced type materials for creating such body panels. Examples of such processes are shown in U.S. Pat. Nos. 3,913,343 to Pfaf; 3,761,560 to Newleave; 3,022,210 to Philipps; 4,610,835 to Ghavamikia; 5,013,771; and 4,986,948 to Komiya et al. These and other processes are known and many of these are directed to various methods for improving the surface quality of final molded parts. However, typically even in these processes some type of finishing is required to bring the part into a class 'A' type surface. Many glass reinforced type parts have problems with glass fiber read through or the like which requires further finishing and finalization to produce the desirable class 'A' finish on the pan.

Thus, it has been a goal in the art to provide for a simple system which allows production of parts having class 'A' surfaces from a resin transfer molding process or the like wherein little or no final finishing is required for preparing the final class 'A' surface on the part.

SUMMARY OF THE INVENTION

Thus, in accordance with these goals the present invention provides a composition for resin transfer molding of composite body panels for a vehicle which have a substantially finished class 'A' surface upon completion of the molding process. The compositions of the present invention include as critical ranges from about 38% to about 44% by weight of a resin suitable for resin transfer molding; from about 28% to about 32% of glass reinforcement fibers; and from about 28% to about 32% of a filler material. It has been found by the inventors that these critical ranges provide for improved finish on class 'A' surface body panels.

It is an object of the present invention to manufacture resin transfer molded body panels with a class 'A' surface substantially directly out of the mold.

Other objects and advantages of the present invention will become apparent from the following detailed description of the preferred embodiments, the example and the claims appended hereto.

DETAILED DESCRIPTION OF THE PREFERRED EMBODIMENTS

Thus, in accordance with the present invention a composition for resin transfer molding (RTM) of composite body panels of a vehicle is provided wherein the composition includes from about 38% to about 44% by weight of resin suitable for resin transfer molding; from about 28% to about 32% by weight of a fiberglass reinforcement fibers; and from about 28% to about 32% by weight of a filler material. In a preferred embodiment compositions in accordance with the present invention consists of 40%–42% resin, 28%–30% fiberglass mat and 28%–30% of a filler material.

The ranges set forth above have been found to be critical in resin transfer molding processes of the present invention, in that, operation outside the ranges will not result in the desirable class 'A' surface for body panels. These compositions are particularly useful in resin transfer molding processes wherein large surface area type body panels are manufactured such as body side panels, hoods, fenders and the like.

As set forth above, a first critical constituent in the compositions of the present invention is the resin constituent. In a preferred embodiment a catalyzeable acrylic resin is utilized with low profile additives. Suitable low profile additives include polyvinyl acetates, polyurethanes, and polymethyl methacrylates. Modified acrylic resins suitable for use in the present invention include from about 5% to about 10% styrene monomers blended therein. Preferred resins are relatively low in viscosity having ranges of from about 50 to 150 centipoise. Resins based on methyl methacrylates are preferred. A particularly preferred resin is a Modar ™ 824LTS low profile modified resin available from ICI Chemicals. Such a resin is described in U.S. Pat. No. 4,480,079 to Orton et al., issued Oct. 30, 1984 which is hereby incorporated herein by reference. Other known RTM resins such as polyesters or the like may also be utilized provided they are in the viscosity range set forth above. Preferably, such resins also contain from about 1 to about 10% suitable low profile additives such as polyvinyl acetate, polyurethane and polymethyl methacrylate having molecular weights of from about 200 to about 10,000. In its broad aspects from about 38% to about 44% of the resin is utilized. Preferably, resin is utilized in compositions of the present invention in quantities of from about 40% to about 42% for proper finish characteristics.

Suitable fillers useful in the present invention include calcium carbonate, mica, talc, aluminum hydrates, clays and the like as are known to those skilled in the art. In a preferred embodiment calcium carbonate with a mean particle size of about 3 microns is utilized.

The fiber reinforcement constituent of the present invention is preferably a mat composition fiber reinforcement. Preferably, a continuous strand glass mat with a preformable binder and a surfacing veil is utilized in the present invention. A preferred material is a 3.5 oz./ft$^2$ continuous strand Unifilo ™ glass with a 20 mil surfacing veil of a material such as Surmat 100-SF. Other glass mats such as mats constructed of one to two inch lengths of chopped glass strands or swirl type mats can be utilized provided the above critical ranges are fulfilled. Surfacing veils useful in the present invention generally range from about 10 to about 30 millimeters in thickness with preferred ranges of about 15 to about 25 millimeters. As stated above the glass fiber mat must be within the range of from about 28% to about 30% by weight. Utilization of the glass fiber material above this range results in fiber read through. Operation below this range results in strength and warpage problems.

In accordance with the process aspects of the present invention the mold temperature for operation of the RTM process is from about 135° F. to about 155° F. utilizing mold pressures of from about 50 to about 150 psi with injection pressures of about 30 psi. These temperature parameters are also critical, in that, if lower temperatures are utilized the surface is subject to degradation, whereas warpage of parts will result at higher temperatures.

Thus, in accordance with the process aspects, first a glass fiber mat is selected within the above parameters. Thereafter, the mat and veil is preformed into the rough shape of the part. A release agent is then applied to the mold in a layer of 1.5–3 mils flexible or a semi-flexible polyester based gel coat is applied to the mold. A preferred gel coat is an orthothalic and isothalic blend polyester gel coat available from Ferro Corp., Plastic Colorants and Dispersion Division, of Plymouth, Ind., under the product designation 6V 43794 light gray orthoflex, an orthothalic based polyester based gel coat with 1% to 2% methyl ethyl ketone peroxide resin. Another preferred gel coat may be obtained from Cook Composites, St. Louis, Mo. under the name of RTM Gell 980-A-083 which is a light gray sandable flexible isothalic based polyester gel coat resin with from about 1% to about 2% methyl ethyl ketone peroxide catalyst. The glass fiber mat is then placed in the RTM mold and the mold is closed. Thereafter, the resin and filler combination is intimately blended and injected into the mold with suitable catalysts as prescribed by the resin manufacturer. The part is allowed to cure for about 10 to 15 minutes and the mold is opened removing the finished part. The final part has improved surfaces which require little finishing for providing a class 'A' surface.

Further understanding of the present invention will be gleaned in the following examples which are set forth herein for purposes of illustration but not limitation.

EXAMPLE I

A vehicle hood assembly was produced as follows. After applying suitable release agents to the epoxy tools of a mold for a vehicle hood polyester base, a gel coat was applied to the show surface portion of the epoxy tool in a layer of about 1.5 to 3.0 mils. Thereafter, a 3.5 oz/ft.$^2$ Unifilo ™ glass mat with 20 mil Surmat 100-SF were placed in the heated mold for forming to the shape of the vehicle hood.

A modar 824LTS ICI resin was prepared in a shear mixture by placing 500 lbs. of resin, 400 lbs. of $C_aCO_3$ with 2.5 lbs. of dimethyl aniline promoter on the A side of the mixer and 500 lbs. of resin, 400 lbs. of $C_aCO_3$ and 7.5 lbs. of benzoyl peroxide catalyst in the B side of the mixer. Thereafter, the hydraulic press is closed with a clamp pressure of 150 psi. The mold was heated to a temperature of 150° F. Thereafter, with the mixing head inserted into the mold tooling A and B portions are mixed and injected into the mold instantaneously at a pressure of 30 PSI.

Thereafter, the part was allowed to cure in the mold for about 20 minutes. The final part was removed from the mold and was found to have a class 'A' surface right out of the mold.

EXAMPLE II

Vehicle hood assemblies are prepared as follows.
Suitable release agents are applied to the epoxy molds, thereafter a conventional release agent is applied to the molds. Thereafter a gel coat is applied to the show surface portion of the mold in a layer of from about 1.5 to about 3.0 mils.

Glass mats are utilized with 824 LTS ICI resin and calcium carbonate to form various resin transfer molding operations in amounts of from 38% to 44% resin, 28% to 32% glass fibers and from 28% to 30% of calcium carbonate.

Hood parts are formed using the molding procedure of Example I. The parts formed are found to have a class 'A' surface right out of the mold.

While the above detailed description describes the preferred embodiments of the present invention, it is to be understood that the present invention is susceptible to modification, variation and change without deviating from the scope and fair meaning of the subjoined claims.

What is claimed is:

1. A process for resin transfer molding of vehicle body panels comprising the steps of:
    a) providing a resin transfer mold for a vehicle body panel having a show surface portion capable of molding of a class "A" surface;
    b) providing a composition consisting of from about 38% to about 44% of a modified acrylic resin binder, wherein said modified acrylic resin binder includes a low profile additive;
        from about 28% to about 32% by weight of glass fibers;
        from about 28% to about 30% by weight of a filler material other than glass fibers;
    c) molding a vehicle body part by injection of said composition into said mold for forming a final part having a class 'A' surface.

2. The process according to claim 1 wherein said acrylic resin is a methacrylate resin having a viscosity of from about 50 to about 150 centipoise.

3. The process according to claim 1 wherein said filler is selected from the group consisting of calcium carbonate, mica, talc, aluminum hydrate, and clays.

4. The process according to claim 1 wherein said glass fibers consist of a continuous strand mat of glass fibers and a veil portion.

5. The process according to claim 1 wherein said filler is a calcium carbonate filler.

6. The process according to claim 1 wherein said resin binder includes styrene monomers blended therein in amounts of from about 5 to about 10% by weight, and includes from about 1 to about 10% by weight of said low profile additive, and wherein said low profile additive is selected from the group consisting of polyvinyl acetate, polymethyl methacrylates, polyurethanes and mixtures thereof.

7. The process of claim 1 wherein a surface forming portion of the mold is coated with a gel coat material.

8. A process for resin transfer molding of vehicle body panels requiring a Class 'A' show surface consisting essentially of the steps of:
    a) providing a resin transfer mold having a show surface forming portion capable of molding a class 'A' surface for a vehicle body panel;
    b) coating said show surface forming portion of the mold with a gel coat in a thickness of from about 1.5 to about 3 mils;
    c) placing a continuous strand glass fiber mat having a density of about 2.5 to about 4.5 oz/ft$^2$ in said mold with a surfacing veil having a thickness of from about 10 to about 30 millimeters adjacent a show surface side of said mold;

d) injecting a curable resin mixture into the mold such that a composition consisting of from about 40% to about 42% by weight of a methacrylate resin having from about 5 to about 10% by weight of styrene monomers and from about 1 to about 10% by weight of a low profile additive selected from the group consisting of polymethyl methacrylate, polyurethane polyvinyl acetates and mixtures thereof; from about 28% to about 30% by weight glass fiber mat and from about 28% to about 30% by weight of a filler material selected from the group consisting of calcium carbonate, mica, clays, talc and aluminum hydrate; and e) retaining said composition in said mold for a time and temperature to cure said resin whereby a final part is manufactured with a class 'A' surface.

9. A process for resin transfer molding of vehicle body panels comprising the steps of:
 a) providing a resin transfer mold for a vehicle body panel having a show surface portion capable of molding of a Class A surface;
 b) providing a composition consisting of from about 38% to about 44% of an acrylic resin binder;
 from about 28% to about 32% by weight of glass fibers;
 from about 28% to about 30% by weight of a filler material selected from the group consisting of calcium carbonates, micas, talcs, aluminum hydrates and clays;
 c) molding a vehicle body part by injection of said composition into said mold for forming a final part having a class "A" surface.

10. The process according to claim 9 wherein said acrylic resin is a methacrylate resin having a viscosity of from about 50 to about 150 centipoise.

11. The process according to claim 9 wherein said glass fibers consist of a continuous strand mat of glass fibers and a veil portion.

12. The process according to claim 9 wherein said filler is a calcium carbonate filler.

13. The process according to claim 9 wherein said resin binder includes styrene monomers blended therein in amounts of from about 5 to about 10% by weight and from about 1 to about 10% by weight of a low profile additive selected from the group consisting of polyvinyl acetate, polymethyl methacrylates, polyurethanes and mixtures thereof.

14. The process of claim 9 wherein a surface forming portion of the mold is coated with a gel coat material.

* * * * *